US007310689B2

(12) United States Patent
Goode et al.

(10) Patent No.: US 7,310,689 B2
(45) Date of Patent: *Dec. 18, 2007

(54) BYPASSING DISK I/O OPERATIONS WHEN PORTING A COMPUTER APPLICATION FROM ONE OPERATING SYSTEM TO A DIFFERENT OPERATING SYSTEM

(75) Inventors: David Harold Goode, San Jose, CA (US); William Earl Malloy, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 569 days.

This patent is subject to a terminal disclaimer.

(21) Appl. No.: 10/824,902

(22) Filed: Apr. 14, 2004

(65) Prior Publication Data

US 2004/0199677 A1 Oct. 7, 2004

Related U.S. Application Data

(62) Division of application No. 10/033,810, filed on Dec. 18, 2001, now Pat. No. 6,754,734.

(51) Int. Cl.
*G06F 3/00* (2006.01)
(52) U.S. Cl. .............................. 710/5; 710/39; 710/40; 707/2; 711/112
(58) Field of Classification Search ...................... 710/5
See application file for complete search history.

(56) References Cited

U.S. PATENT DOCUMENTS

| | | | | |
|---|---|---|---|---|
| 4,408,273 A | 10/1983 | Plow | ........................... | 364/200 |
| 5,097,533 A | 3/1992 | Burger et al. | ................ | 395/500 |
| 5,337,412 A | 8/1994 | Baker et al. | ................. | 395/275 |
| 5,386,525 A | 1/1995 | Noack | .......................... | 395/400 |
| 5,522,054 A | 5/1996 | Gunlock et al. | ............. | 711/112 |
| 5,675,781 A | 10/1997 | Duncan et al. | .............. | 395/608 |
| 5,813,005 A | 9/1998 | Tsuchida et al. | .............. | 707/10 |
| 5,819,310 A | 10/1998 | Vishlitzky | .................... | 711/114 |
| 5,870,587 A | 2/1999 | Danforth et al. | ............ | 395/500 |
| 5,901,319 A | 5/1999 | Hirst | ........................... | 395/710 |

(Continued)

OTHER PUBLICATIONS

W. Kohler, *EMC Information Sharing: Direct Access to MVS Data from UNIX and NT*, Proc. of the 1999 ACM SIGMOD Int. Conf. on Management of Data Jun. 1-3, 1999, Philadelphia, Pennsylvania, SIGMOD Record, vol. 28, Issue 2, Jun. 1999.

(Continued)

*Primary Examiner*—Donald Sparks
*Assistant Examiner*—Niketa I. Patel
(74) *Attorney, Agent, or Firm*—Fredrik Mollborn

(57) ABSTRACT

Systems, methods, and computer products that improve the performance of computer-implemented I/O operations for complex applications, such as a database, that are ported to target computer systems that are not tailored to support the high-performance services that may benefit applications. Complex applications, such as a database, often manage I/O access operations by a caching mechanism that is tailored to the needs of the application. When porting an application to a target computer system that does not support certain I/O access features, I/O performance of the application may be limited. The present invention may be implemented by introducing specialized I/O access features that are tailored to enhance I/O access performance for complex applications, such as a database.

3 Claims, 5 Drawing Sheets

U.S. PATENT DOCUMENTS

| | | | |
|---|---|---|---|
| 5,915,131 A | 6/1999 | Knight et al. | 395/892 |
| 5,925,109 A | 7/1999 | Bartz | 710/14 |
| 5,930,824 A | 7/1999 | Anglin et al. | 711/162 |
| 5,978,815 A | 11/1999 | Cabrera et al. | 707/204 |
| 5,999,930 A | 12/1999 | Wolff | 707/8 |
| 6,012,104 A | 1/2000 | Van Nguyen et al. | 710/8 |
| 6,044,415 A | 3/2000 | Futral et al. | 710/33 |
| 6,065,088 A * | 5/2000 | Bronson et al. | 710/263 |
| 6,098,149 A | 8/2000 | Ofer et al. | 711/112 |
| 6,108,653 A | 8/2000 | Pereira | 707/7 |
| 6,112,257 A | 8/2000 | Mason, Jr. et al. | 710/18 |
| 6,122,685 A | 9/2000 | Bachmat | 710/74 |
| 6,128,674 A * | 10/2000 | Beukema et al. | 710/23 |
| 6,141,707 A | 10/2000 | Halligan et al. | 710/36 |
| 6,167,459 A | 12/2000 | Beardsley et al. | 710/3 |
| 6,170,023 B1 | 1/2001 | Beardsley et al. | 710/36 |
| 6,182,158 B1 | 1/2001 | Kougiouris et al. | 709/328 |
| 6,185,638 B1 | 2/2001 | Beardsley et al. | 710/36 |
| 6,192,359 B1 | 2/2001 | Tsuchida et al. | 707/4 |
| 6,199,068 B1 * | 3/2001 | Carpenter | 707/100 |
| 6,199,117 B1 | 3/2001 | Cox et al. | 709/328 |
| 6,209,059 B1 | 3/2001 | Ofer et al. | 711/114 |
| 6,216,211 B1 | 4/2001 | McBrearty et al. | 711/162 |
| 6,240,467 B1 | 5/2001 | Beardsley et al. | 710/5 |
| 6,292,856 B1 * | 9/2001 | Marcotte | 710/39 |
| 6,301,605 B1 | 10/2001 | Napolitano et al. | 709/201 |
| 6,301,640 B2 | 10/2001 | Barve et al. | 711/113 |
| 6,304,923 B1 * | 10/2001 | Klein | 710/41 |
| 6,366,992 B2 * | 4/2002 | Manning | 711/167 |
| 6,502,205 B1 | 12/2002 | Yanai et al. | 714/7 |
| 6,629,220 B1 * | 9/2003 | Dyer | 711/158 |
| 6,671,767 B2 | 12/2003 | Furuumi et al. | 711/100 |
| 6,801,976 B2 * | 10/2004 | Creta et al. | 710/310 |
| 7,113,937 B2 * | 9/2006 | Goode et al. | 707/2 |

OTHER PUBLICATIONS

A. Smith, et al., *A Versatile, Source-Independent System for Digital Data Management*, EOS Transactions, American Geophysical Union, vol. 67, No. 15, Apr. 15, 1986.

Martin et al., *Performance Analysis of the VSAM Method*, Angewandte Informatik, vol. 27, No. 8, pp. 334, 342, Aug. 1985. (German translation).

M. Simpson, *Using APL As a Preprocessing Selector from large VSAM Files*, Conference Proc. APL 84, ACM, Finland Jun. 11-15, 1984. APL Quote Quad, vol. 14, No. 4, pp. 297-302, Jun. 1984.

\* cited by examiner

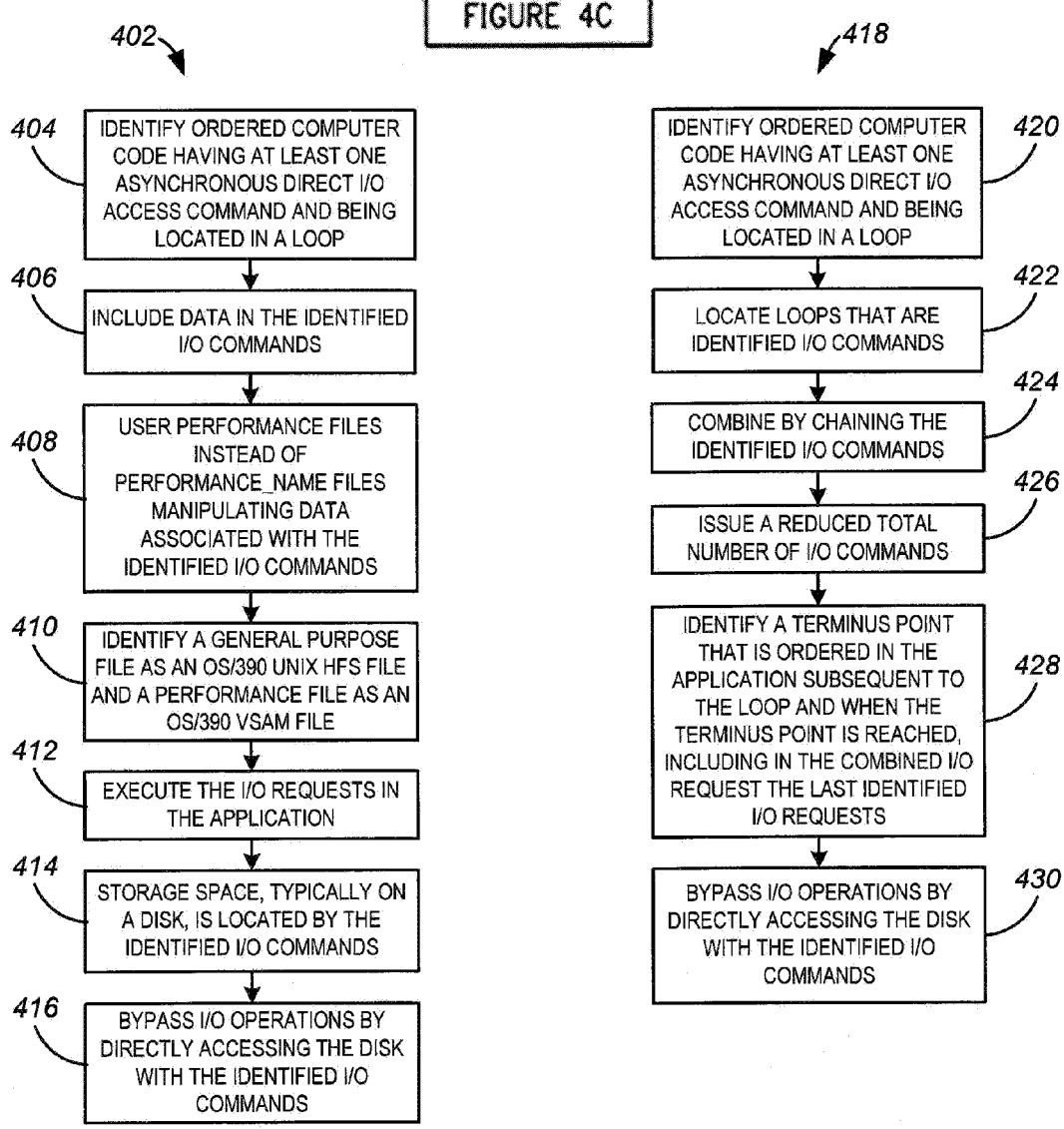

BYPASSING DISK I/O OPERATIONS WHEN PORTING A COMPUTER APPLICATION FROM ONE OPERATING SYSTEM TO A DIFFERENT OPERATING SYSTEM

CROSS REFERENCE TO RELATED APPLICATIONS

This patent application is a divisional application of and claims priority to commonly-assigned application No. Ser. 10/033,810 now U.S. Pat. No. 6,754,734, titled "Systems, Methods, and Computer Program Products to Improve Performance of Ported Applications, Such as a Database" filed on Dec. 18, 2001, by David H. Goode and William E. Malloy, which is incorporated herein by reference in its entirety.

BACKGROUND OF THE INVENTION

1. Field of the Invention

The present invention is directed to the field of accessing an Input/Output (I/O) device, such as a disk volume. It is more particularly directed to improving the performance of computer-implemented I/O operations that are directed to disk drives and that are associated with ported computer applications, such as a database.

2. Description of the Background Art

Typically complex computer applications, such as a database, are ported to a 25 variety of computer systems. The porting process often includes special changes to the application to enable efficient and complete operation of the application on different computer systems. I/O operations are a significant factor in the overall performance of a complex computer application. High-performance computer applications, such as a database, may issue asynchronous, direct disk 110 commands which are not supported on the target system. A "target computer system" as used herein refers to a computer system environment consisting of one or more specific programming languages, the application programming interfaces (APIs) available in the programming languages, and the associated file system or file systems. Therefore, changes to I/O operations may be made during the porting of an application to ensure efficient operation of the application on the computer system. Such a computer system may include the products sold under the trademarks IBM® S/390® (hereinafter S/390) that includes the IBM® OS/390® (hereinafter OS/390) operating system and associated disk volumes.

Disk volumes are units of data storage that typically include data and the information used to access and manipulate the data. Disk volumes may be used to store a file system and information necessary to manipulate the file system. For example, when implementing database applications that may include disk 110 access commands for operation on the IBM OS/390 that supports UNIX® System Services (hereinafter OS/390 UNIX) the facilities of a hierarchical file system (HFS) may be employed. However, file systems, such as the OS/390 UNIX HFS, may only support queued disk I/O access and minimal I/O caching.

I/O caching is typically managed by either a file system or a disk controller. I/O caching is the process of storing I/O data in computer memory that may be accessed more quickly than the disk device. Therefore, I/O caching may be characterized as temporary storage of data associated with disk I/O requests in computer memory. Complex applications may implement I/O caching services for the operation of the application, bypassing the I/O caching facilities of the general-purpose file system.

More particularly general-purpose file systems, such as the OS/390 UNIX HFS, may not have an I/O caching scheme that is tailored to the characteristics of databases. For example, a file system, such as the OS/390 UNIX HFS, may only support queued disk I/O access commands and not direct disk I/O access commands. Queued disk I/O access performs its own I/O caching features for proper operation. However, a general-purpose data caching strategy that operates with queued disk I/O access operations may not be optimal for a given application. Therefore an application, such as a database, may perform its own cache management, bypass the file system, and directly access information on a disk. For example, a database may achieve better I/O access performance by using direct I/O access features, available as high-level computer language APIs on many UNIX platforms, in place of queued disk I/O access operations.

Queued disk I/O access commands may operate most efficiently with sequential I/O access operations and not random I/O access operations. Highly complex software applications, such as a database, often issue random I/O access requests and the performance of the complex software applications may suffer if I/O requests are serviced by queued disk I/O, which may be designed to optimize sequential rather than random access operations. Therefore, high-performance computer applications, such as a database, may issue direct disk I/O commands that can efficiently process random I/O requests when accessing disk volumes. If the application being ported is written using asynchronous, direct I/O APIs not supported on the target computer system, which is the case with the OS/390 UNIX C Library and the OS/390 HFS, the performance of the application may suffer because those direct I/O commands must be rewritten as queued I/O commands. This may be the case if the computer system is optimized for queued I/O. Those skilled in the art will appreciate the use of sequential I/O and random I/O operations with respect to disk I/O access.

A general-purpose file system may only be able to service I/O requests synchronously. Synchronous I/O operations typically wait for confirmation that the I/O disk access command has completed before executing another disk I/O access command. The delay in proceeding with subsequent disk I/O access commands impacts application I/O access performance. Asynchronous I/O access commands typically enable other computer operations to proceed that would otherwise wait until the I/O operation successfully completes. This allows I/O operations and other computer operations to overlap and proceed in an asynchronous fashion. Consequently, asynchronous I/O operations perform more efficiently than synchronous disk I/O operations for certain high performance applications, such as a database. Therefore, database software applications suffer performance penalties if they are constrained to use high-level language APIs that do not support asynchronous I/O operations, such as the OS/390 UNIX C Run-time APIs.

In summary, complex applications, such as databases, often include specialized features that ensure that I/O requests are properly sequenced. Typically, these features operate via direct disk I/O operations that facilitate servicing random I/O requests. Therefore, the application code may bypass the I/O caching features of the general-purpose file system in favor of the specialized I/O caching features of the application. When porting the application, limitations of the target computer system may impact the performance of the application. For instance, if a particular UNIX file system supports queued I/O access commands directed to disk volumes and not direct I/O access commands, unacceptably poor I/O access performance for the application may result. Also, if a file system supports synchronous I/O access to disk volumes and not asynchronous I/O access, poor performance for the application may result. Further, a general-purpose file system I/O caching scheme that is optimized for sequential I/O requests may result in poor performance for an application, such as a database, that issues many random I/O requests.

From the foregoing it will be apparent that there is a need to improve disk I/O when porting a complex application that uses asynchronous, direct I/O commands to a target computer system that does not support those commands.

SUMMARY OF THE INVENTION

The invention may be implemented as systems, methods, and computer products that improve the performance of computer-implemented I/O operations for complex applications, such as a database, that are ported to computer systems that are not tailored to support the high-performance services that may benefit applications. Complex applications, such as a database, often manage I/O access operations by a caching mechanism that is tailored to the needs of the application. For instance, the application I/O caching mechanism may operate-in conjunction with direct disk I/O operations that facilitate servicing random I/O requests. When porting an application to a target computer system that does not support certain I/O access APIs, I/O performance of the application may be limited. For instance, a computer system's high-level language APIs may not support certain I/O access features. The present invention may be implemented by introducing specialized I/O access features that are tailored to enhance I/O access performance for complex applications, such as a database.

For example, the present invention may be implemented so that support for queued disk I/O access commands is augmented with support for direct disk I/O access commands. The augmented support is contingent upon the availability in a computer system of synchronous, direct I/O access to disk volumes. This augmented support ensures that random I/O requests are handled optimally in addition to sequential I/O requests by an application. The present invention may be implemented on the IBM OS/390 that supports UNIX System Services with the HFS. More particularly, the present invention may augment facilities on the IBM OS/390, such as the high-level language APIs, so that an application that is ported to the IBM OS/390 UNIX System Services will operate more efficiently. OS/390 UNIX provides support for APIs and an interactive shell interface. The OS/390 APIs enable a user or program, such as a database, to request OS/390 services and OS/390 UNIX System Services. The shell interface is an execution environment that services interactive requests from users and batch requests that are included in computer programs, such as a database.

Typically, complex applications that issue direct I/O requests may be associated with an I/O caching mechanism that is managed by the application. When porting the application for use with a general-purpose file system that does not support direct I/O access, performance may be degraded. An implementation of the present invention introduces the use of direct I/O operations with applications ported for operation with general-purpose file systems that do not support direct I/O operations. The direct I/O operations used by the present invention and directed to disk volumes enable faster application I/O operations than queued I/O operations for certain complex software applications. An implementation of the present invention uses direct I/O operations to support asynchronous I/O access to disk volumes instead of synchronous I/O access to disk volumes, and to optimally process random I/O requests. Therefore, performance of disk I/O access operations that service highly complex software applications and that are associated with porting the application to a target computer system that does not support direct I/O operations, such as the OS/390 UNIX HFS, is improved by the present invention over past solutions. It will be appreciated that the queued I/O access operations and the direct I/O access operations typically manipulate user data.

In the preferred embodiment of the present invention, the I/O operations that may benefit from the introduced I/O access operations are identified. More particularly, I/O access commands in the application that are within a programmatic loop and that are asynchronous direct I/O commands are identified. That is, the present invention identifies loops in the ordered computer code of the application that generate uninterrupted sequences of asynchronous I/O requests for which the associated waits are not executed until after execution of the loop completes. Such uninterrupted sequences of asynchronous I/O requests are commonly found in loops that are associated with applications that handle buffer flushing. While the preferred embodiment of the present invention operates on I/O access commands that are within a programmatic loop, uninterrupted sequences of asynchronous I/O requests may alternatively be located in other programmatic constructs.

The preferred embodiment then combines, by chaining, the multiple asynchronous direct I/O requests into a much smaller number of disk I/O requests than would otherwise be executed. Those skilled in the art will appreciate that asynchronous I/O requests are typically not followed immediately by a wait request and may be aggressively scheduled for disk I/O operations by techniques such as chaining.

Therefore, the preferred embodiment of the present invention operates most efficiently in a computer system that supports chaining of multiple I/O requests into a single I/O request, such as the OS/390. For example, chained I/O disk requests may be aggregated so that multiple non-contiguous blocks of four thousand ninety-six bytes of information are processed by a single, chained I/O disk request. Execution time for characteristic test loads managed by the present invention is reduced by as much as 60 percent as compared to queued I/O operations on the OS/390 UNIX HFS that does not support combining multiple direct asynchronous I/O requests.

Also, certain queued I/O operations that occur prior to a loop are identified. That is, on UNIX systems a file may be initially opened for queued disk I/O access then closed and reopened for direct disk I/O access. The preferred embodiment of the present invention identifies such queued disk I/O access operations and converts them to direct I/O access operations where appropriate.

The preferred embodiment of the present invention also identifies a terminus point that is located subsequent to the programmatic loop. When the terminus point is reached, any remaining identified asynchronous direct I/O requests are combined by chaining and the last, possibly partially full, block of chained I/O requests is submitted.

In the preferred embodiment of the present invention, the I/O access requests made by the application, which are associated with general-purpose files, are replaced with direct I/O commands that are associated with high-performance files that support direct I/O access. Typically, when the application program code is executed, an I/O access request is transmitted to the general-purpose file system. In an embodiment of the present invention, application-directed I/O access of OS/390 UNIX HFS files via queued I/O commands may be redirected for direct I/O access to VSAM files. The general-purpose files may be OS/390 UNIX HFS files and the performance files may be VSAM files. The Virtual Storage Access Method (VSAM) is an access method for direct or sequential processing of fixed-length and varying-length records on disks.

More particularly, an embodiment of the present invention may operate by use of a high-performance improvement code module that accepts lists of buffer addresses and disk addresses, data length values, and aggregation_indicator flags, and issues direct I/O requests instead of queued I/O requests. Without this invention, such direct I/O requests would otherwise be converted to queued I/O requests. For example, on the OS/390 a database application may issue direct I/O access requests during flushing operations in its I/O cache. Transmission of the data associated with the VSAM file may be enabled by use of the buffer address that is the location of the data in computer memory, the disk address that is the location of the data on a disk, the data length value, and the aggregation_indicator flag. Examples of operations that transmit data to and from a file include reading from a file or writing to a file.

Additionally, the preferred embodiment maintains a "performance_name" file that contains the name of the associated high-performance file which can be accessed with direct I/O commands. For example, the performance_name file may be an OS/390 HFS file that contains the name of an associated VSAM file. Therefore, an association is created between the OS/390 HFS file that would have been used if direct I/O were supported by OS/390 HFS and the VSAM file that is used in its stead. For example, an embodiment of the present invention converts what would otherwise be the queued I/O requests generated during execution of the application code with direct I/O access commands that manipulate the VSAM files by associating the I/O command directed to an OS/390 UNIX HFS file with a direct I/O command to the VSAM file.

While on most UNIX platforms general-purpose files support direct I/O access, the target computer system may lack such support. By creating an association between such general-purpose files and the performance files that support direct I/O access commands, database administrators may continue accessing some of the information about the general-purpose files while accessing a disk by direct disk I/O access. Therefore, this reduces the amount of application program code that must be changed to accommodate the computer code introduced in the preferred embodiment of the present invention. This also maintains ease of use for the application users since the translation between the general-purpose files and the performance files is typically transparent to the user. For example by relying on the association between the general-purpose files and the performance files, the computer programs that rely on information in OS/390 UNIX HFS files to determine characteristics of a file, such as whether the file exists, do not have to be altered to be made aware of the existence of the VSAM files.

An embodiment of the present invention improves the performance of computer-implemented I/O operations for complex applications, such as a database. More particularly, applications which use asynchronous, direct I/O commands that are ported to target computer systems which do not support such commands may be enhanced by the present invention to improve I/O performance. That is, the present invention may be implemented by augmenting general-purpose I/O access features with specialized I/O access operations that are tailored to enhance I/O access performance for complex applications, such as a database.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 4A is a flow diagram that illustrates operations of the present invention;

FIG. 4B is a flow diagram that illustrates combining asynchronous I/O requests;

In the following detailed description and in the several figures of the drawings, like elements are identified with like reference numerals.

DETAILED DESCRIPTION OF THE INVENTION

Figure 1:
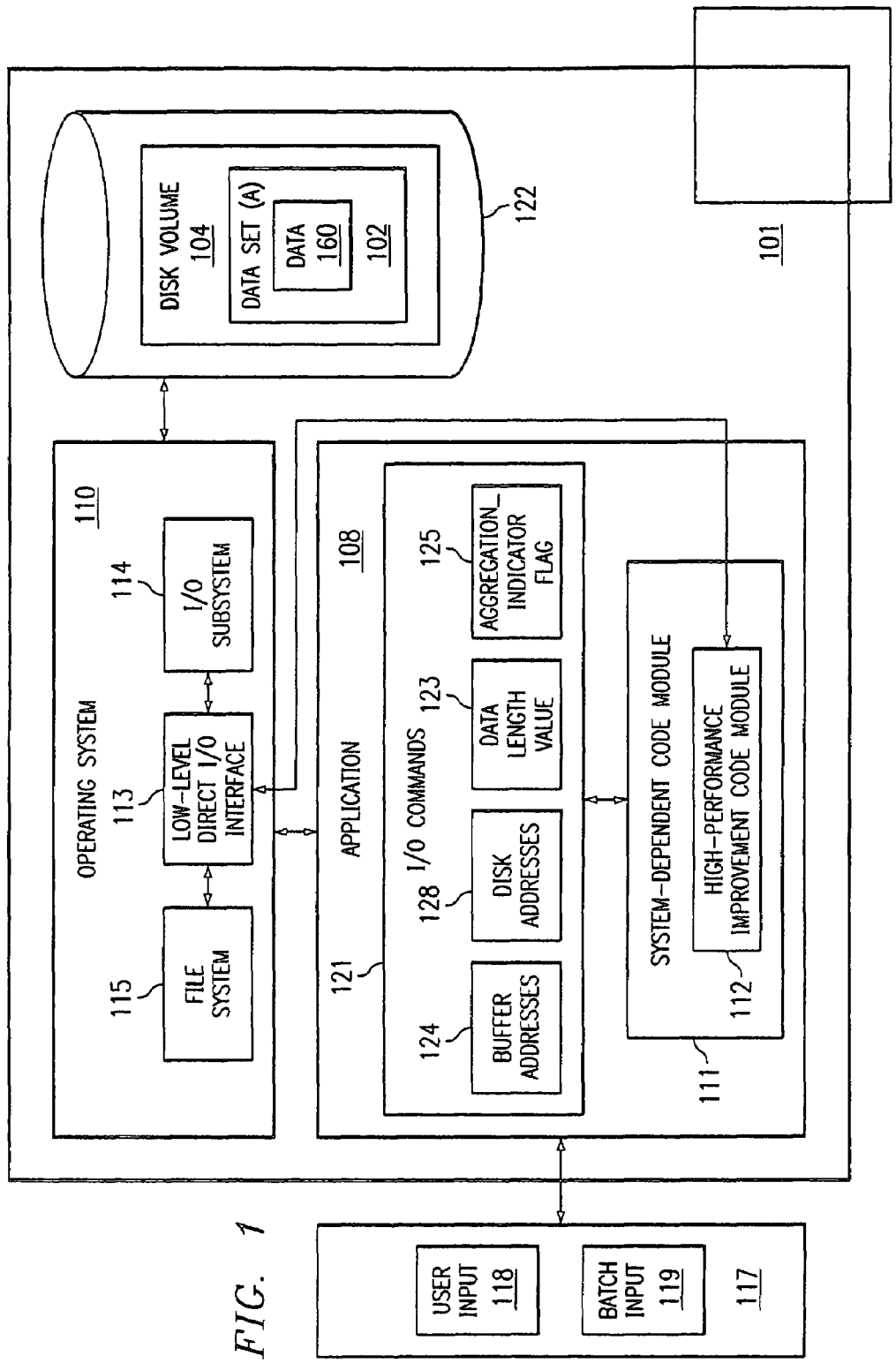
FIG. 1 is a block diagram that illustrates the present invention.

As shown in the drawings and for purposes of illustration, an embodiment of the invention improves the performance of computer-implemented I/O operations for complex applications, such as a database, that are ported to computer systems that are not tailored to support the high-performance services used by the applications.

Existing systems may not offer the APIs that provide adequate performance of disk I/O access operations associated with complex computer applications, such as a database, that operate with tailored I/O caching. General-purpose file systems may not provide sufficient facilities, such as the compiler run-time APIs, to accommodate the performance-related features of complex applications. For example, an application-specific I/O caching mechanism may operate in conjunction with direct disk I/O operations that facilitate servicing random I/O requests, but the general-purpose file system may be unable to accommodate the tailored I/O caching mechanism of the application. When porting the application to a computer system that does not take advantage of application I/O caching or support direct I/O access, I/O performance of the application may be limited. The present invention may be implemented by substituting I/O access facilities of a particular file system with I/O access features that are tailored to enhance I/O access performance for complex applications, such as a database.

For example, complex software that is ported to OS/390 UNIX, such as a database, which uses direct I/O interfaces available in other UNIX environments, will not be able to bypass the inefficient queued I/O access support of the OS/390 UNIX HFS in order to use more efficient direct I/O access operations. The present invention advantageously operates to augment queued I/O access operations with direct I/O access operations.

FIG. 1 is a block diagram that describes the elements of the present invention that improves performance of computer-implemented I/O operations by augmenting I/O access facilities of a computer system's general-purpose file system with I/O access features that are tailored to enhance I/O access performance for complex applications, such as a database. Element 101 illustrates a computer system, such as a target computer system, that executes commands according to an embodiment of the present invention.

A complex application 108 that is being ported, such as a database, may incorporate at least three types of I/O access code. The I/O access code may be unmodified and the application 108 may rely on the facilities of a computer system 101, such as an operating system 110. Alternatively, the application 108 may modify the I/O access code for a computer system 101 environment that only supports queued I/O access, such as IBM OS/390 UNIX. Finally, the application 108 may augment general-purpose I/O access operations with customized direct I/O access operations that take advantage of any I/O interfaces that may be provided by the computer system 101 and that may enhance I/O performance of the application 108. It is assumed that a complex application 108 manages serialization of I/O requests 121 in a thread-safe manner. The preferred embodiment of the present invention optimizes I/O requests 121 for complex applications 108 that have already taken on the burden of managing serialization and have, for the files 102 associated with these I/O requests 121, abandoned the I/O caching scheme typically available via the general-purpose file system 115. Such a general-purpose file system 115 may be optimized to support queued I/O. Those skilled in the art will appreciate that applications 108 developed for operation on other operating systems 110 which support application-level I/O caching and that use direct, asynchronous I/O, will incorporate program code that performs such serialization. The terms "I/O request" and "I/O command" will be used interchangeably herein.

Data sets 102, or files, that may be associated with application program code 108, are typically stored by allocating the files 102 to disk volumes 104 that reside on particular disks 122. Applications 108 are generally able to perform I/O access operations to data sets 102 without having much detail about the underlying disk system 122. A complex application 108 that manages its own I/O caching may manage disk I/O directly. More particularly, the preferred embodiment of the present invention performs I/O access operations that access a particular disk volume 104 and data set 102. It will be appreciated that a user interface 117 may include user input 118 or batch input 119 that may be accepted by the application 108 and manage data sets 102 that will support the use of direct I/O requests 121. A "data set" is a file that is a named set of records that are typically used in a database and that are stored or processed as a unit. The terms "data set" and "file" will be used interchangeably herein.

When a complex application 108, which uses asynchronous, direct I/O commands is ported to a target computer system 101 that does not support those commands, I/O performance may be degraded. Therefore, the high-performance improvement code module 112 advantageously introduces disk I/O access operations that support the tailored I/O operations of the complex application 108. For example, an embodiment of the high-performance improvement code module 112 does not rely on the queued I/O access commands 121 that are typically performed by OS/390 UNIX but introduces support for direct I/O access commands 121 associated with VSAM data sets.

The present invention typically operates in conjunction with an application 108 that includes a system-dependent code module 111 that isolates the features that are specific to the target computer system 101 to facilitate, among other things, the management of I/O access to a disk device 122. That is, the application program code 108 may make general requests to the system-dependent code module 111 that translates those requests so that they may be processed by the target computer system 101. Typically the system-dependent code module 111 will pass I/O requests 121 to a general-purpose file system 115. The general-purpose file system 115 may simplify I/O requests 121 for an operating system 110 by providing an interface to read and write user data 160 on a disk 122. This simplifies the translation of I/O requests 121 from the file system 115, such as those from OS/390 UNIX HFS, so that an operating system 110, such as OS/390 UNIX, may communicate with the disk 122.

The system-dependent code module 111 isolates system-specific code to a system-dependent layer. Therefore, when porting a database management tool or other application 108 to another operation system 110, such as porting a database from an AIX® operation system to OS/390 UNIX, the changes may be isolated to the system-dependent code module 111. It will be appreciated that the present invention may operate without support of the system-dependent code module 111 or the low-level direct I/O interface 113, of the I/O subsystem 114 and may interface directly with the disk volume 104.

The present invention advantageously operates by use of the high-performance improvement code module 112 that introduces support for direct I/O requests 121. For example, OS/390 supports direct I/O requests 121 to files 102 while OS/390 UNIX does not. Therefore applications 108 that are ported from other UNIX platforms to OS/390 UNIX may suffer performance degradation if the applications 108 rely on direct I/O commands 121 for optimal I/O performance. An embodiment of the present invention introduces I/O operations that support direct I/O requests 121 in the absence of such support in the C Run-time Library Interfaces and the underlying OS/390 HFS file system.

Figure 5:
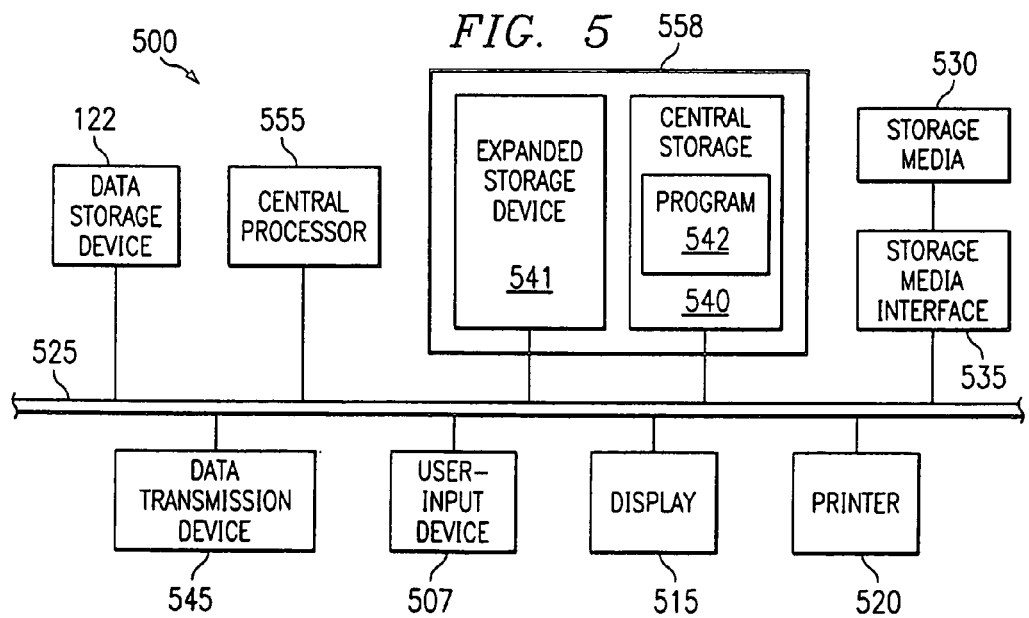
FIG. 5 is a block diagram of a computer system suitably configured for employment of the present invention.

More particularly, the high-performance improvement code module 112 operates as a component of the system-dependent code module 111, which receives I/O requests 121 from the application program code 108. Then the high-performance improvement code module 112 processes buffer addresses 124 and disk addresses 128, data length values 123, and aggregation_indicator flags 125, that are included in the I/O requests 121 of the application 108 and passes aggregated collections of these I/O requests 121 to the low-level direct I/O interface 113. The buffer address 124 is a location identifier for the data 160 while it is stored in computer memory 558 (as shown in FIG. 5). The disk address 128 is a location identifier for the data 160 while it is stored on a disk 122. The data length value 123 indicates the amount of space the data 160 requires. The aggregation_indicator flag 125 indicates that the I/O request 121 for data 160 transmission should be aggregated. More particularly, the high-performance improvement code module 112 passes information to the low-level direct I/O interface 113 that is translated into a form that is suitable for processing by the low-level direct I/O interface 113, and that preserves the high-performance characteristics of the I/O request 121 as generated by the application 108. The low-level direct I/O interface 113 then transmits the I/O requests 121 via the I/O subsystem 114 for transmission of the data 160 to the disk 122.

The preferred embodiment of the present invention changes some features used in disk I/O access. For example, in the system-dependent code module 111, the code responsible for file open and close interfaces now checks for direct I/O file types. Then a file 102 is opened or closed and any other operations necessary to support direct I/O file opening and closing are performed according to the preferred embodiment of the present invention.

Figure 2:
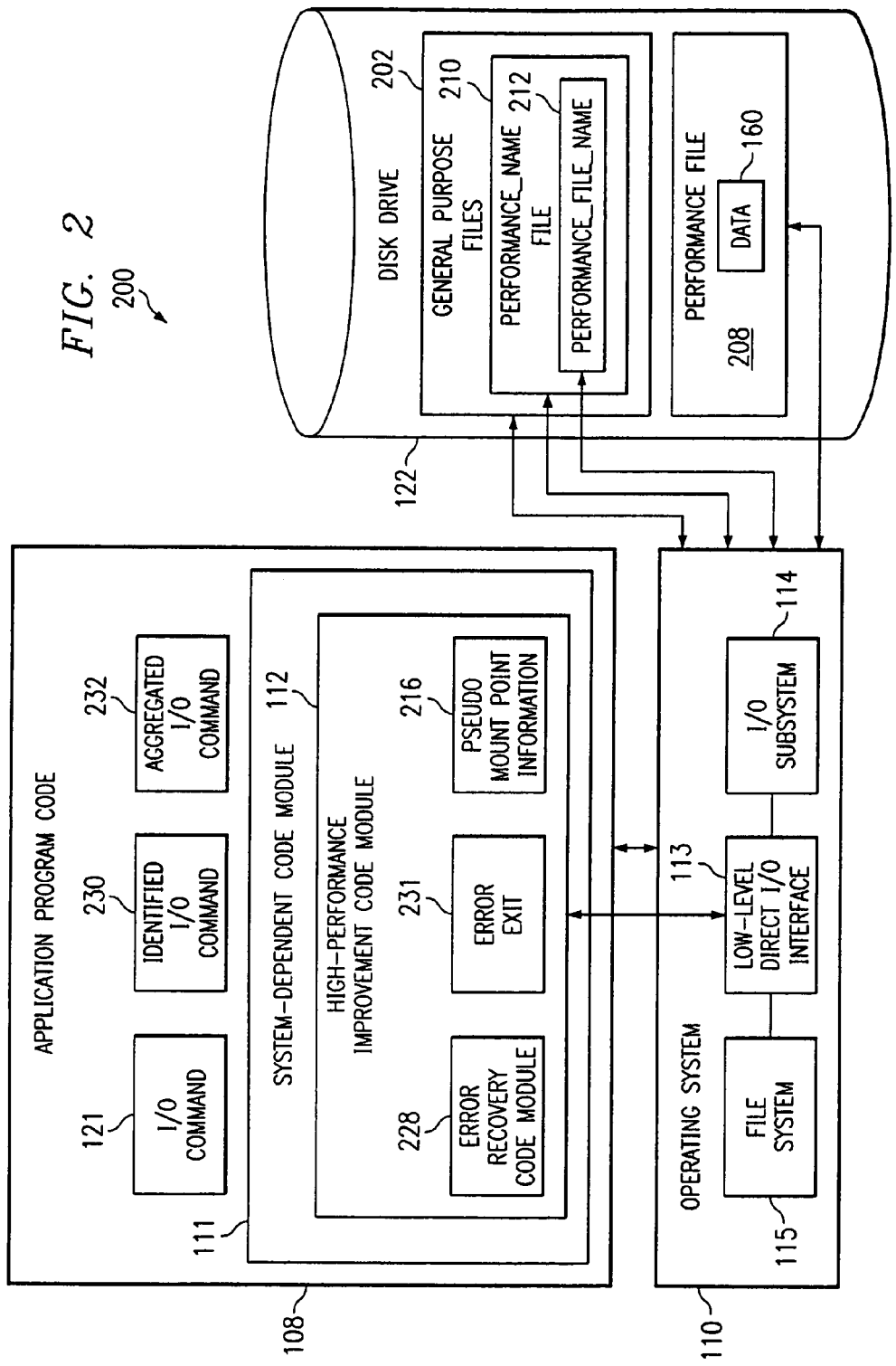
FIG. 2 is a block diagram that illustrates the performance_name file and its association with other components of the present invention.

As shown in FIG. 2, and in element 200, an embodiment of the present invention advantageously uses a performance_name file 210 for I/O access operations. The performance_name file 210 creates an association between the general-purpose files 202 that would typically be used to store data 160 and performance files 208 that are used by an embodiment of the present invention. In the preferred embodiment of the present invention, the I/O access commands 121 that are critical to disk I/O access performance are identified. That is, those asynchronous, direct I/O access commands 121 that are associated with performance_name files 210, and that are located within a programmatic loop in the application 108 are identified. Then the identified I/O requests 230 that would otherwise have to be ported as queued I/O requests 121 are redirected to a performance file 208 using direct I/O commands 121. For example, the general-purpose file 202 may be an OS/390 UNIX HFS file and the performance file 208 may be an OS/390 VSAM file. The present invention may also aggregate the identified I/O access commands 230 by request chaining. Then the aggregated I/O access commands 232 are directed to the performance file 208 instead of the general-purpose files 202.

The data 160 that would typically be stored on a disk drive 122 in a general-purpose file 202 is now stored on a disk drive 122 in a performance file 208. The preferred embodiment also transforms the general-purpose file 202, which on other computer platforms would contain application data 160, into a performance_name file 210 that contains the name of the performance file 208 that is used store data 160. Therefore, by creating an association between the general-purpose files 202 and the performance file 208, application administrators may continue accessing the data 160 and the information associated with the general-purpose files 202 via the performance_name file 210 without direct knowledge of the performance_file_name 212. Also, characteristics of the performance file 208, such as whether performance file 208 is in use may be obtained by accessing the performance_name file 210 without requiring the user to know the name of the performance file 208.

The high-performance improvement code module 112 operates at the behest of the system-dependent code module 111 to translate I/O requests 121 for the low-level direct I/O interface 113. The high-performance improvement code module 112 includes API features to facilitate its use. It will be noted that I/O requests 121 that are not identified for translation by the high-performance improvement code module 112 are passed from the application 108 to the system-dependent code module 111 and on to the operating system 110 without modification. More specifically, the file system 115 then translates the I/O requests 121 so that they may be passed on to the low-level direct 110 interface 113. The low-level direct I/O interface 113 then passes I/O requests 121 to the 110 subsystem 114 for transmission to the disk 122.

In an embodiment of the present invention, the application 108 cooperates with the high-performance improvement code module 112 to perform operations that would otherwise rely on UNIX mount point information. That is, the high-performance improvement code module performs operations using "pseudo UNIX mount point information" 216. When a general-purpose file 202 is created, a performance file 208 is obtained and the corresponding performance_name file 210 is created. The performance_name file 210 contains a performance_file_name 212, here the name of the performance file 208. Therefore, the performance_name file 210 associates the general-purpose file 202 with the performance file 208 that is used to execute direct I/O commands 121.

Continuing with another example, when a performance_name file 210, such as an OS/390 UNIX HFS file, is deleted the corresponding performance file 208, such as a VSAM file, is marked as free. For a further example, when a performance_name file 210 is renamed, the corresponding performance file 208 does not need to be renamed and may continue to be referenced via the performance_name file 210. When a performance_name file 210 is copied, both the performance_name file 210 and the associated performance file 208 are created and are associated. All file operations must succeed on both the performance_name file 210 and the associated performance file 208 in order to consider the operation successful.

The preferred embodiment of the present invention attempts to recover from failures that occur as a result of accessing performance files 208. An error recovery code module 228 may be designated as part of the initialization and definition process associated with the high-performance improvement code module 112. The error recovery code module 228 may be driven by any abnormal event and may request a log or a data dump from the operating system 110. An error exit 231 may also be designated in conjunction with the high-performance improvement code module 112 that acquires control in the event of permanent I/O access errors. Minimally, a report of the occurrence of an error may be provided. Recovery from the error may also be attempted, depending on the type of error.

The embodiment of the present invention also provides other interface features. For example, features such as initialization of asynchronous direct I/O requests 121 are provided by the high-performance code module 112 to facilitate manipulation of performance files 208.

Figure 3:
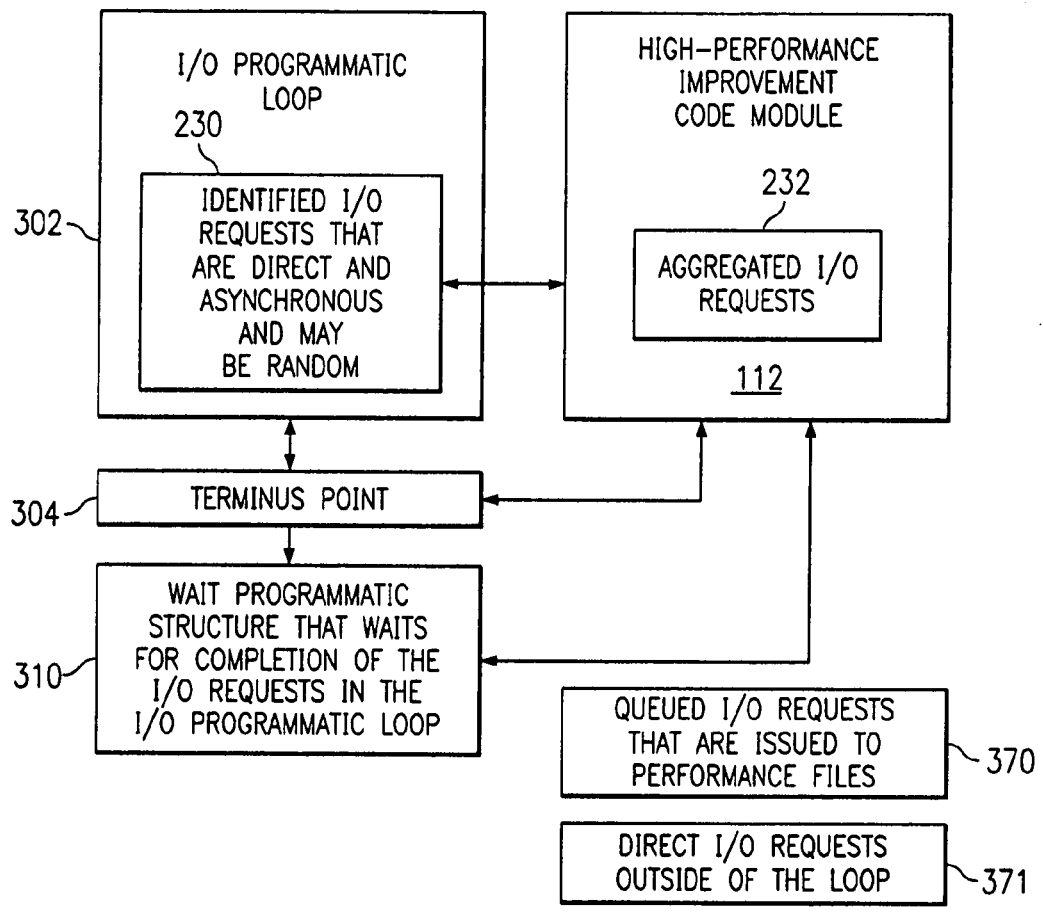
FIG. 3 is a block diagram that illustrates the I/O programmatic loop.

FIG. 3 illustrates the operations associated with at least one I/O programmatic loop 302. The I/O requests 121 that are included in an I/O programmatic loop 302 in the application 108 are located. Any given loop in the application program code 108 is considered an I/O programmatic loop 302 only with respect to a given performance file 208. For each performance file 208 this determination is based on whether a plurality of asynchronous I/O requests 121 are issued to that performance file 208. The present invention is generally described with respect to I/O commands 121 associated with a single performance file 208. However, the invention is able to operate as described herein on multiple performance files 208 concurrently. Element 121 is described with respect to FIG. 1, and element 208 is described with reference to FIG. 2.

The I/O requests 121 that are direct and asynchronous are located and are the identified I/O requests 230. The preferred embodiment of the present invention operates on uninterrupted sequences of asynchronous I/O requests 121 for which the associated waits are not executed until after the sequence is complete. Such uninterrupted sequences of asynchronous I/O requests 121 are commonly generated by loops that are associated with applications 108, such as databases, that handle buffer flushing. The illustration of FIG. 3 is therefore exemplary, as uninterrupted sequences of asynchronous I/O requests 121 may be located in an I/O programmatic loop 302 or may alternatively be located in other programmatic constructs.

The identified I/O requests 230 are aggregated, in the preferred embodiment of the present invention, into aggregated I/O requests 232. The aggregated I/O requests 232 are manipulated by the high-performance improvement code module 112 so that they may be used in operations that access performance files 208 that are stored on the disk 122. Element 122 is described with reference to FIG. 1.

The identified I/O requests 230 are asynchronous and may be random, that is, referencing non-contiguous disk 122 locations. Typically, complex applications 108, such as databases, issue many random I/O requests 121. The present invention may operate on I/O requests 121 that are either synchronous or asynchronous and that are either random or sequential, although synchronous I/O requests 121 will not be aggregated.

As the execution of the I/O programmatic loop 302 proceeds, I/O requests 121 are bundled into optimal groups which are submitted as single direct I/O requests 121 to the low-level direct I/O interface 113. When processing of the I/O programmatic loop 302 is concluded, a terminus point 304 is reached and any remaining identified 110 requests 230 are aggregated into a final aggregated I/O request 232. Then this final, aggregated I/O request 232 is transmitted to the low-level direct I/O interface 113 for transmission of the data 160 to the disk 122. Then the wait programmatic structure 310 waits for completion of the execution of the identified I/O requests 230 in the I/O programmatic loop 302. Although the preferred embodiment of the present invention operates to intervene in the processing of asynchronous I/O requests 121 in a loop, the waits that are associated with the asynchronous I/O requests 121 may be executed anywhere outside of the I/O programmatic loop 302 and beyond the terminus point 304. Wait processing might, for example, be deferred until the buffer used in the request is actually needed. So, waits might be demand driven rather than operating in a simple loop. Elements 113 and 160 are described with reference to FIG. 1.

Direct I/O requests issued by the application 108 outside of the I/O programmatic loops 371 are passed to the low-level direct I/O interface 113 immediately and without aggregation. I/O programmatic loops 302 must be selected such that queued I/O requests for a performance file 370 are not included in the I/O programmatic loop 302. Outside of the I/O programmatic loops 302 and for a given performance file 208, the performance file 208 may be opened or closed, using standard operating system APIs, for specific types of I/O commands 121. In particular, a performance file 208 is often initially opened for queued I/O. Then, following the issuance of a number of queued I/O commands 121, the performance file 208 may be closed for queued I/O, then reopened for direct I/O processing. When a performance file 208 is open for queued I/O, the preferred embodiment of the present invention receives queued I/O commands for a performance file 370, translates them to direct I/O commands 121 that are appropriate for the low-level direct I/O interface 113, passes the translated requests to the low-level direct I/O interface 113, and then waits for the direct I/O commands 121 to complete.

Figure 4C:
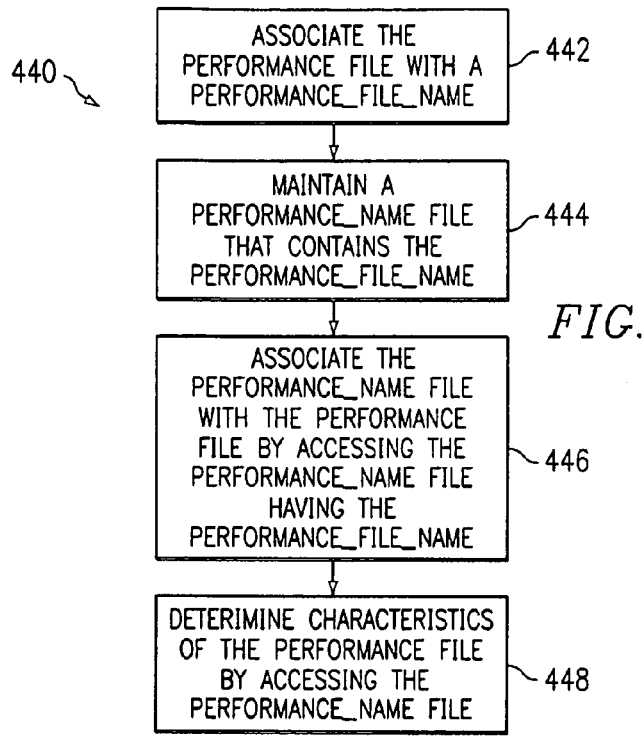
FIG. 4C is a flow diagram that illustrates the operations associated with the performance_name file.

FIG. 4 describes the method of the present invention as shown in FIGS. 4A, 4B, and 4C. FIG. 4A is a flow diagram that illustrates the present invention. FIG. 4B is a flow diagram that illustrates combining asynchronous 110 requests. FIG. 4C is a flow diagram that illustrates the operations associated with the performance_name file 210 (as shown in FIG. 2).

As shown in FIG. 4A, and in the element 402, the I/O access operations associated with the present invention are described. As shown in element 404, the preferred embodiment of the present invention identifies the ordered computer code having at least one asynchronous direct I/O access command 121 and being located in an I/O programmatic loop 302. An embodiment of the present invention determines files 102 that may benefit from direct disk I/O access operations 121 by identifying filename suffixes that are typically accessed directly. Those skilled in the art will appreciate that this is one method of determining files 102 that may benefit from direct disk I/O access and that other methods may be used. Elements 102 and 121 are described with reference to FIG. 1 and element 302 is described with reference to FIG. 3.

The preferred embodiment of the present invention includes data 160 that is associated with the identified I/O commands 230, as shown in element 406. Then as shown in element 408, performance files 208 are used instead of performance_name files 210 to access and store the data 160 that is associated with the identified I/O commands 230. For example and as shown in element 410, the performance_name file 210 may be an OS/390 UNIX HFS file and the performance file 208 may be an OS/390 VSAM file. Elements 208, 210, and 230 are described with reference to FIG. 2 and element 160 is described with reference to FIG. 1.

As shown in element 412 the preferred embodiment executes the I/O requests 121 in the application 108. Then as shown in element 414, storage space, typically on a disk 122, is located by the identified I/O commands 230. As shown in element 416, the disk 122 is directly accessed with the identified I/O commands 230. Elements 108 and 122 are described with reference to FIG. 1.

As shown in FIG. 4B, and in element 418, the method of the present invention advantageously exploits the performance characteristics of disks 122 that perform I/O operations faster when given fewer I/O requests 121. That is as shown in element 420, ordered computer code having at least one asynchronous direct I/O access command and being located in a loop is identified. Next, in element 422, loops are processed in the application program code 108, such as database code, in which a plurality of identified I/O requests 230 are executed. The loops are likely to appear in most database applications in the areas of the computer code that are responsible for moving data 160 from the cache memory 558 (as shown in FIG. 5) to the 122.

Then the present invention combines the identified I/O requests 230 into a much smaller number of aggregated I/O requests 232 (as shown in FIG. 2) than would otherwise be executed, as shown in element 424. It will be appreciated that asynchronous I/O requests 121 are typically issued before previous I/O requests 121 have completed. For example, asynchronous I/O requests 121 are typically not followed immediately by a wait request and may be aggressively scheduled for disk I/O operations. Therefore, the present invention takes advantage of the asynchronous I/O requests 121 to combine the identified I/O requests 230. Then as shown in element 426, a reduced total number of disk I/O requests 121 are issued.

The preferred embodiment of the present invention identifies a terminus point 304 that is ordered in the application subsequent to the I/O programmatic loop 302. When the terminus point 304 is reached, the last identified I/O requests 230 are included in the last aggregated I/O request 232, as shown in element 428. Then an embodiment of the present invention uses direct I/O instead of queued I/O to access the disk 122 with the aggregated I/O commands 232, as shown in element 430.

As shown in FIG. 4C, and in element 440, the method of the association between the performance_name file 210 and the performance file 208 is described. A performance_file_name 212 that is associated with a performance file 208 is identified, as shown in element 442. The preferred embodiment maintains a performance_name file 210 that contains the performance_file_name 212 associated with the performance file 208, as shown in element 444. Therefore, the performance_name files 210 are associated with the performance file 208 by accessing the performance_name file 210 having the performance_file_name 212, as shown in element 446. Characteristics of the performance file 208 are determined by accessing the performance_name file 210, as shown in element 448. This applies to file manipulation functions such as "copy," "rename," and "delete," as well as to lower-level routines that schedule I/O requests 121 and process wait requests. Elements 210 and 212 are described with reference to FIG. 2.

FIG. 5 is a block diagram of an exemplary computer system 500, suitable for employment of the present invention. The computer system 500 may be implemented on a general-purpose computer, such as the IBM System/390, or other conventional minicomputer, workstation, or graphics computer device. In its preferred embodiment, the computer system 500 includes a user-input device 507, a display 515, a printer 520, a central processor 555, a memory 558, a data storage device 122, such as a hard drive, an expanded storage 541, a central storage 540, storage media 530, a storage media interface 535, a data transmission device 545, all of which are coupled to a bus 525 or other communication means for communicating information. The central storage 540 is directly addressable by the central processor 555. The expanded storage 541 may be used to relieve the central storage 540 when it is heavily utilized. Although the system 500 is represented herein as a standalone system, it is not limited to such, but instead can be part of a networked system. For example, the exemplary computer system 500 may be connected locally or remotely to fixed or removable data storage devices 122 and data transmission devices 545. For another example, the exemplary computer system 500, such as the target computer system 101 (as shown in FIG. 1A), also could be connected to each other and to other computer systems via the data transmission device 545.

The central storage 540, the expanded storage 541, and the data storage device 122, are storage components that store data 160 (as shown in FIG. 1) and instructions for controlling the operation of the central processor 555, which may be configured as a single processor or as a plurality of processors. The central processor 555 executes a program 542 to perform the methods of the present invention, as described herein. Before processing occurs, a program 542 and its data 160 must reside in central storage 540. Input/Output operations result in the transfer of information between the central storage 540 and the user-input device 507.

While the program 542 is indicated as loaded into the memory 558, it may be configured on storage media 530 for subsequent loading into the data storage device 122 or the memory 558 via an appropriate storage media interface 535. Storage media 530 can be any conventional storage media such as a magnetic tape or an optical storage media. Alternatively, storage media 530 can be another type of electronic storage, located on a remote storage system.

Generally, the computer programs 542 and operating systems 110 (as shown in FIG. 1) are all tangibly embodied in a computer-readable device or media, such as the memory 558, the data storage device 122, and a computer transmission media, such as the data transmission devices 545, thereby making an article of manufacture, such as a computer program product, according to the invention. As such, the terms "computer program product" as used herein are intended to encompass a computer program accessible from any computer readable device or media.

Moreover, the computer programs 542 and operating systems 110 are comprised of instructions which, when read and executed by the exemplary computer system 500, such as the target computer system 101, perform the steps necessary to implement and use the present invention. Under control of the operating system 110, the computer programs 542 may be loaded from the memory 558, the data storage device 122, or the data transmission devices 545 into the memory 558 of the exemplary computer system 500, such as the target computer system 101.

The user-input device 507 is a device, such as a keyboard or speech recognition subsystem, for enabling a user to communicate information and command selections to the central processor 555. The user can observe information generated by the system 500 via the display 515 or the printer 520. The user-input device 507 may also be a mouse, track-ball, or joy stick, that allows the user to manipulate a cursor on the display 515 for communicating additional information and command selections to the central processor 555.

When operating in accordance with one embodiment of the present invention, the exemplary computer system 500 augments general-purpose I/O access facilities of a computer system 500 with specialized I/O access features that are tailored to enhance I/O access performance for complex applications 108 (as shown in FIG. 1), such as a database. The central processor 555 and the program 542 collectively operate to improve the performance of I/O disk access. It will be appreciated that the present invention offers many advantages over prior art techniques.

The present invention is typically implemented using one or more computer programs, each of which executes under the control of an operating system 110 and causes the exemplary computer system 500, such as the computer system 101, to perform the desired functions as described herein. Thus, using the present specification, the invention may be implemented as a machine, process, method, system, or article of manufacture by using standard programming and engineering techniques to produce software, firmware, hardware or any combination thereof.

It should be understood that various alternatives and modifications can be devised by those skilled in the art. However, these should not be viewed as limitations upon the practice of these teachings, as those skilled in the art, when guided by the foregoing teachings, may derive other suitable characteristics of a similar or different nature. The present invention is intended to embrace all such alternatives, modifications and variances that fall within the scope of the appended claims

TRADEMARKS

IBM is a trademark or registered trademark of International Business Machines Corporation in the United States and other countries.

AIX is a trademark or registered trademark of International Business Machines Corporation in the United States and other countries.

S/390 is a trademark or registered trademark of International Business Machines Corporation in the United States and other countries.

OS/390 is a trademark or registered trademark of International Business Machines Corporation in the United States and other countries.

UNIX is a trademark or registered trademark of Unix System Laboratories, Inc.

We claim:

1. A computer-implemented method for bypassing disk I/O operations included in a computer, the computer having an operating system and a computer program application that includes ordered computer code, the ordered computer code including disk I/O access commands, the computer being optimized for support of queued disk I/O access commands, the method comprising:

using asynchronous direct disk I/O access commands in the application ordered computer code;

identifying the asynchronous direct disk I/O access commands in the application ordered computer code; and bypassing the support of the queued disk I/O access commands of the computer by executing the asynchronous direct disk I/O access commands when porting the computer program application from the operating system to a different operating system.

2. A computer system for bypassing disk I/O operations in the computer system, the computer system having an operating system and a computer program application that includes ordered computer code, the ordered computer code including disk I/O access commands, the computer system being optimized for support of queued disk I/O access commands, the system comprising:

the computer system that is designed to optimize the queued disk I/O access commands; and asynchronous direct disk I/O access commands that are included in the application ordered computer code;

wherein the support of the queued disk I/O access commands of the computer is bypassed by executing the asynchronous direct disk I/O access commands when porting the computer program application from the operating system to a different operating system.

3. A computer program product, comprising a computer readable medium including a computer readable program, for bypassing disk I/O operations included in a computer, the computer having an operating system and a computer program application that includes ordered computer code, the ordered computer code including disk I/O access commands, the computer being optimized for support of queued disk I/O access commands, wherein the computer readable program when executed on the computer causes the computer to:

optimize the queued disk I/O access commands;

use asynchronous direct disk I/O access commands in the application ordered computer code;

identify the asynchronous direct disk I/O access commands in the application ordered computer code; and bypass the support of queued disk I/O access commands of the computer by executing the asynchronous direct disk I/O access commands when porting the computer program application from the operating system to a different operating system.

* * * * *